United States Patent [19]

Greiff

[11] Patent Number: 4,623,284

[45] Date of Patent: Nov. 18, 1986

[54] MILLING CUTTER

[75] Inventor: Hermann A. Greiff, Fagersta, Sweden

[73] Assignee: Seco Tools AB, Sweden

[21] Appl. No.: 749,395

[22] Filed: Jun. 27, 1985

[30] Foreign Application Priority Data

Jul. 5, 1984 [SE] Sweden ............................ 8403567

[51] Int. Cl.⁴ ............................................ B26D 1/00
[52] U.S. Cl. ...................................... 407/38; 407/41; 407/49
[58] Field of Search ................... 407/38, 39, 41, 49, 407/36, 37, 46

[56] References Cited

U.S. PATENT DOCUMENTS 3,270,396  9/1966  Williams .............................. 407/39
3,339,257  9/1967  Hargreaves et al. ................. 407/38
3,847,555  11/1974  Pegler et al. .

FOREIGN PATENT DOCUMENTS 2339873  8/1973  Fed. Rep. of Germany .
2806079  2/1978  Fed. Rep. of Germany .

Primary Examiner—Leonidas Vlachos
Attorney, Agent, or Firm—Burns, Doane, Swecker & Mathis

[57] ABSTRACT

A milling cutter comprising a shoe (12), which is secured to the cutter body (10) and carries a cutting insert (11). The shoe (12) is adjustable by means of an adjustment means (13) and clamped by means of clamping means (14,15,16). The adjustment means (13) is adapted to bridge an inner corner (26) on the shoe (12) and the clamping means (14,15,16) comprises a pin (15) which is displaceably arranged in the shoe (12) at the outer end thereof, said pin (15) being adapted to be forced against a supporting surface (28) on the cutter body (10) opposed to the supporting surface (22) on the shoe (12) by means of a clamping screw (16).

14 Claims, 9 Drawing Figures

MILLING CUTTER

The present invention relates to a milling cutter comprising a cutter body, at least one shoe carrying a cutting insert and adjustably secured to the cutter body, and adjustment means for adjusting the position of the shoe in the cutter body to vary the extent of projection of the cutting insert from the cutter body. The adjustment means is provided with a supporting surface intended to rest against a corresponding supporting surface on the cutter body and a wedge face intended to rest against a corresponding wedge face on the shoe. The milling cutter further comprises clamping means adapted to clamp the shoe in adjusted position.

Milling cutters of this prior art typ are disclosed in for instance U.S. Pat. No. 3,847,555, DE-A-No. 2339873 and DE-B-No. 2806079.

In those previously known milling cutters there is a risk that the adjustment means is rotated somewhat about its longitudinal axis during clamping of the shoe, which might cause displacement of the shoe out of its accurately adjusted position. Further, the shoe is clamped indirectly to the cutter body by means of the wedge which clamps the cutting insert in the shoe which means that the clamping arrangement takes up a comparatively great deal of room.

One object of the present invention is therefore to provide a milling cutter in which the shoe cannot be displaced out of its accurately adjusted position when being clamped by means of the clamping means.

Another object of the invention is to provide a milling cutter in which the shoes, when seen in the circumferential direction, can be mounted as close to each other as possible.

These and other objects of the invention have been attained by giving the invention the characterizing features stated in the appending claims.

The invention is described in detail in the following with reference to the accompanying drawings in which one embodiment is shown by way of example. It is to be understood that this embodiment is only illustrative of the invention and that various modifications thereof may be made within the scope of the claims.

Figure 1:
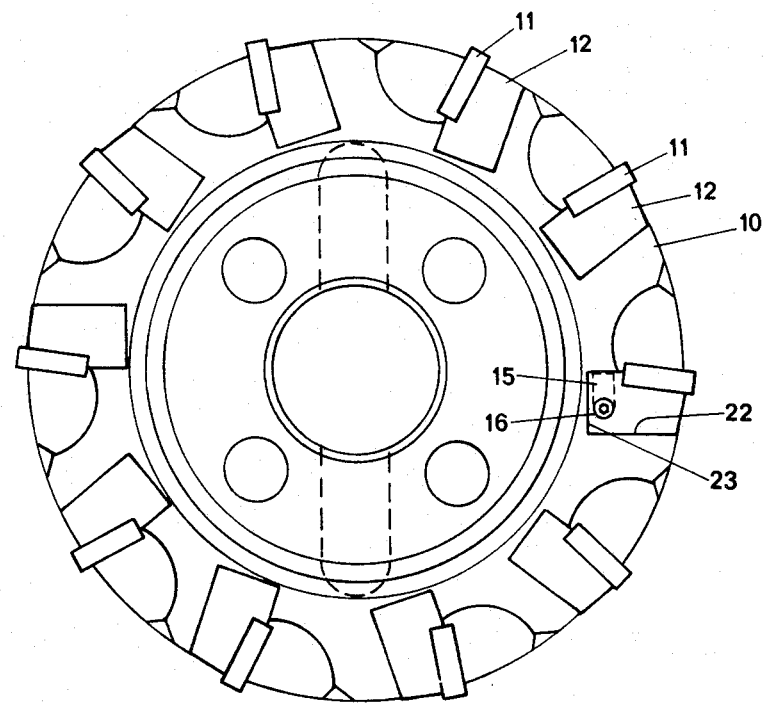
FIG. 1 shows an end view of one embodiment of a milling cutter according to the invention.
Figure 2:
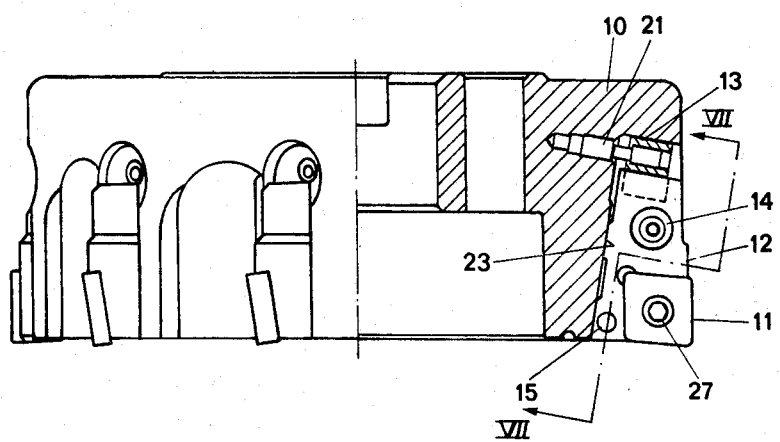
FIG. 2 shows a side view, partially in section, of the milling cutter in FIG. 1.

The milling cutter shown in the drawings comprises a cutter body 10 and a plurality of cutting inserts 11. Each of the cutting inserts is mounted in a shoe or cassette 12. The position of the shoes 12 in the cutter body 10 can be adjusted by means of an adjustment means 13. By adjusting the position of the shoes 12 the extent of projection of the cutting insert 11 from the cutter body 10 can be varied. Upon adjustment of the shoe 12 to an exactly determined position the shoe is secured in this position by means of a clamping means comprising a fastening screw 14 and a clamping screw 16 cooperating with a pin 15. The screws 14,16 and the pin 15 are described in detail in the following. The adjustment means 13 is provided with a supporting surface 17 which is adapted to rest against a corresponding supporting surface 18 on the cutter body 10. The adjustment means 13 is also provided with a wedge face 19 which is adapted to rest against a corresponding wedge face 20 on the shoe 12.

When the position of the shoe 12 is the cutter body 10 is adjusted the adjustment means 13 is displaced in its longitudinal direction by means of a screw 21 screwed into the cutter body. When the adjustment 13 is displaced, thus, a relative movement does arise along the wedge faces 19,20. The supporting surface 17 of the adjustment means 13 and the supporting surface 18 on the cutter body 10 are in a manner known per se generally curved. Usually the supporting surfaces 17,18 are partially cylindrical as in the illustrated embodiment. However, other shapes might be used, for instance a generally curved one having faceted surface portions, provided that they allow the adjustment means 13 to be at least somewhat rotated about its longitudinal axis. The fastening screw 14 has such a direction that, upon clamping of the shoe 12 by means of the fastening screw, force components do arise acting on the wedge face 19 of the adjustment means 13, a longitudinal supporting surface 22 on the cutter body 10 and a generally transversely thereto extending supporting surface 23 on the cutter body 10. If a conventional adjustment means is used, wherein the sector of a circle generally formed by the partially cylindrical supporting surface has an included angle equal to 180°, there is a risk that the adjustment means during adjustment of the shoe might have been rotated somewhat out of the position in which exact abutment does exist between the whole wedge faces 19,20. When the fastening screw 14 is tightened, then, the adjustment means will be caused to rotate back to this position, thereby moving the shoe out of its exactly adjusted position.

According to a preferred embodiment, therefore, the adjustment means 13 is provided with a tongued portion 24 which has a supporting or localizing surface 25 for the shoe 12. The supporting surface 25, which is a continuation of the supporting surface 22, ensures that correct mutual position is obtained between the adjustment means 13 and the shoe 12. Due to the tongued portion 24, thus, the sector of a circle formed by the partially cylindrical supporting surface 17 has an included angle $\alpha$ larger than 180°. The adjustment means 13, thus, is adapted to bridge an inner corner 26 on the shoe 12. In the illustrated embodiment the supporting surfaces 17,18 are circular-cylindrical. As said above, however, other shapes, for instance faceted ones, might be used which allow turning of the adjustment means 13.

Figure 3:
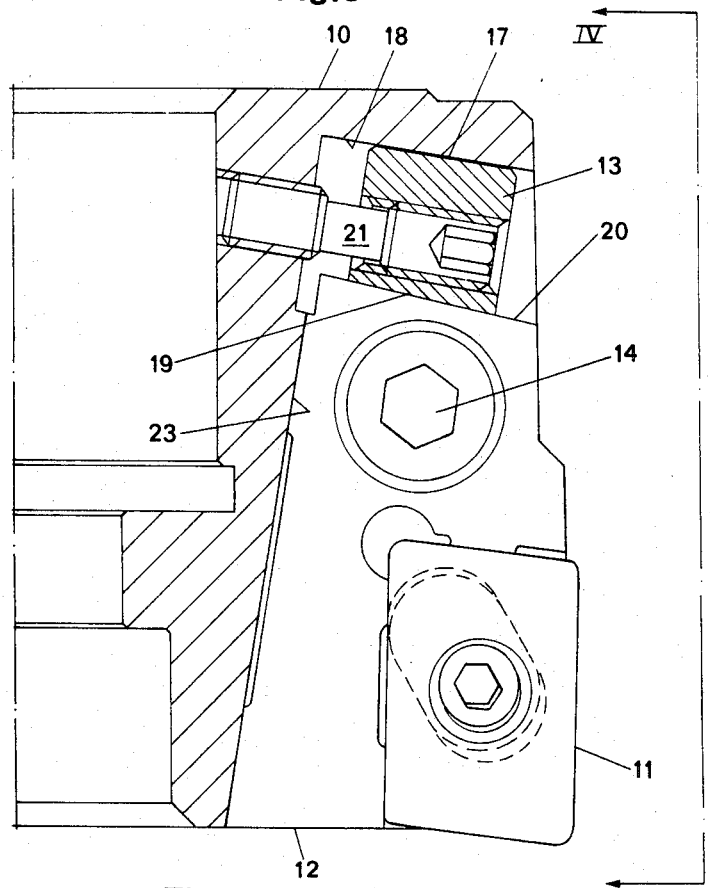
FIG. 3 shows on an enlarged scale the shoe in FIG. 2 and surrounding portions of the cutter body.
Figure 4:
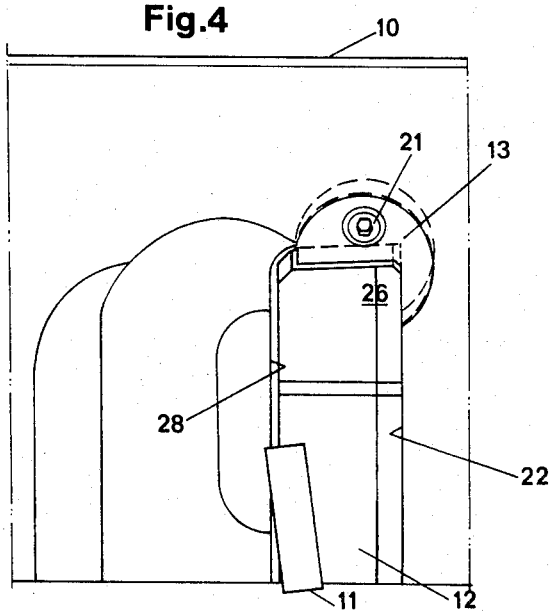
FIG. 4 is a side view seen along the line IV—IV in FIG. 3.
Figure 5:
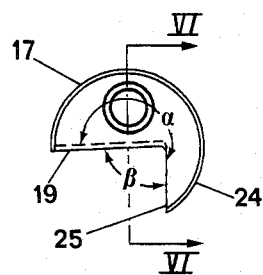
FIG. 5 shows an end view of the adjustment means for adjusting the position of the shoe.
Figure 7:
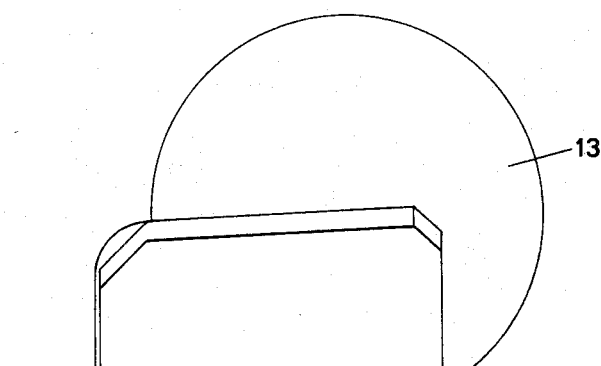
FIG. 7 is a section taken on the line VII—VII in FIG. 2.
Figure 6:
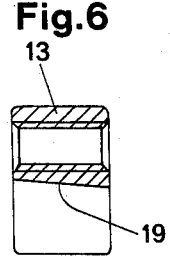
FIG. 6 is a section taken on the line VI—VI in FIG. 5.
Figure 9:
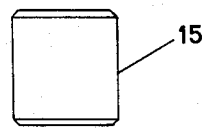
FIG. 9 shows a pin included in the clamping means.
Figure 8:
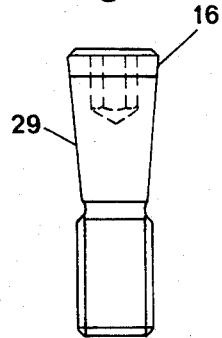
FIG. 8 shows a clamping screw included in the clamping means.
Figure 8:
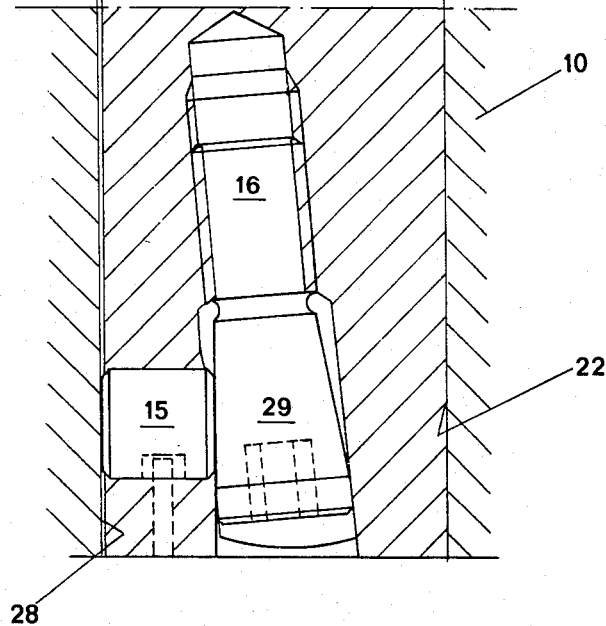

The supporting surface 25 on the adjustment means 13 extends generally transversely relative to the wedge face 19. In the preferred embodiment the wedge face 19 and the supporting surface 25 therebetween form an included angle $\beta$ smaller than 90°. As seen in FIG. 6 the wedge face 19 of the adjustment means 13 has such a direction that the shoe 12 is displaced axially outwards, i.e. downwards in FIG. 3, when the adjustment means 13 is displaced radially inwards, i.e. to the left in FIG. 3. As previously mentioned the present invention also seeks to make possible mounting of the shoes 12 as close to each other as possible when seen in the circumferential direction of the milling cutter. For that purpose the cutting inserts 11 are secured to the shoes 12 by means of screws 27, which means that spacious wedges are not required. In order to obtain a reliable clamping of the shoe 12 against the supporting surface 22 the clamping means of the shoe therefore comprises a pin 15 which is displaceably arranged in a bore in the shoe at the outer end thereof. The pin 15 can be forced against a supporting surface 28 on the cutter body opposed to the supporting surface 22 by means of a clamping screw 16 which is screwed into the shoe 12 and movable generally seen in the longitudinal direction of the shoe. the clamping screw 16, thus being movable generally perpendicular to the longitudinal direction of the pin 15, is provided with a conical portion 29 which is adapted to rest against the end face of the pin 15 opposed to the supporting surface 28.

I claim:

1. A milling cutter comprising a cutter body, a plurality of supporting surfaces on said cutter body at least one shoe carrying a cutting insert, said shoe being adjustably secured to at least one of said supporting surfaces on said cutter body, adjustment means adjusting the position of the shoe in the cutter body to vary the extent of projection of the cutting insert from the cutter body, said adjustment means having a supporting surface resting against a corresponding at least one of said supporting surfaces on the cutter body and a wedge face resting against a corresponding wedge face on the shoe, and clamping means clamping the shoe in an adjusted position, the supporting surface of the adjustment means being generally curved, a sector of a circle generally formed by said curved supporting surface having an included angle larger than 180°, the adjustment means bridging an inner corner on the shoe, said adjustment means abutting the shoe from two sides and being arranged for turning within the cutter body.

2. A milling cutter according to claim 1, wherein the adjustment means (13) is adapted to bridge an inner corner (26) on the shoe (12).

3. A milling cutter according to claim 2, wherein the adjustment means is provided with a supporting surface which is generally transverse to the wedge face of the adjustment means.

4. A milling cutter according to claim 3, wherein the wedge face of the adjustment means and the transverse supporting surface therebetween form an included angle smaller than 90°.

5. A milling cutter according to claim 4, wherein th transverse supporting surface of the adjustment means substantially provides an extension of a longitudinal supporting surface on the cutter body supporting the shoe, said longitudinal supporting surface extending in the longitudinal direction of the shoe.

6. A milling cutter according to claim 5, wherein the wedge face of the adjustment means has a direction such that the shoe is displaced axially outwards upon displacement of the adjustment means radially inwards.

7. A milling cutter comprising a cutter body, a plurality of supporting surfaces on said cutter body at least one shoe carrying a cutter insert, said shoe being adjustably secured to said cutter body, adjustment means for adjusting the position of the shoe in the cutter body to vary the extent of projection of the cutting insert from the cutter body, said adjustment means having a supporting surface engaging at least one of said supporting surfaces on said cutter body, a second supporting surface resting against a corresponding wedge face on the shoe, and clamping means clamping the shoe in an adjusted position, the clamping means comprising an elongated pin which is displaceably arranged in a bore in the shoe at the outer end thereof, and a clamping screw which is screwed in the shoe and is movable generally transversely relative to the longitudinal direction of the pin, said clamping screw having a conical portion cooperating with the end surface of the pin, whereby the pin upon actuation by the clamping screw clamps the shoe against at least one of said supporting surfaces on the cutter body, said one of said supporting surfaces being opposed to the pin and extending in the longitudinal direction of the shoe.

8. A milling cutter according to claim 7, wherein the clamping screw is movable generally in the longitudinal direction of the shoe.

9. A milling cutter according to claim 7, wherein the clamping means comprises a fastening screw which traverses the shoe and is screwed into the cutter body, said fastening screw upon tightening thereof clamping the shoe against the wedge face of the adjustment means, said at least one of said supporting surface of the cutter body and a further one of said supporting surfaces on the cutter body, said further one of said supporting surfaces extending generally transversely relative to the first-mentioned said at least one of said supporting surfaces.

10. A milling cutter according to claim 7, wherein the adjustment means is adapted to bridge an inner corner on the shoe, whereby a supporting surface on the adjustment means substantially provides a continuation of the said at least one of said supporting surfaces of the cutter body, said supporting surface on the adjustment means being generally transverse relative to the wedge face thereof, and whereby the wedge face and the transverse supporting surface of the adjustment means therebetween form an included angle smaller than 90°.

11. A milling cutter according to claim 8, wherein the clamping means comprises a fastening screw which traverses the shoe and is screwed into the cutter body, said fastening screw upon tightening thereof being adapted to clamp the shoe against the wedge face of the adjustment means, the said at least one of said supporting surfaces of the cutter body and a further one of said supporting surfaces on the cutter body, said further one of said supporting surfaces extending generally transversely relative to the first-mentioned said at least one of said supporting surfaces.

12. A milling cutter according to claim 8, wherein the adjustment means is adapted to bridge an inner corner on the shoe, whereby a supporting surface on the adjustment means substantially provides a continuation of the said at least one of said supporting surfaces of the cutter body, said supporting surface on the adjustment means being generally transverse relative to the wedge face thereof, and whereby preferably the wedge face and transverse supporting surface of the adjustment means therebetween form an included angle smaller than 90°.

13. A milling cutter according to claim 9, wherein the adjustment means is adapted to bridge an inner corner on the shoe, whereby a supporting surface on the adjustment means substantially provides a continuation of the said at least one of said supporting surfaces of the cutter body, said supporting surface on the adjustment means being generally transverse relative to the wedge face thereof, and whereby preferably the wedge face and transverse supporting surface of the adjustment means therebetween form an included angle smaller than 90°.

14. A milling cutter according to claim 1, wherein the generally curved supporting surface of the adjustment means comprises a portion of a cylinder.

* * * * *